United States Patent Office 3,060,174
Patented Oct. 23, 1962

3,060,174
ESTERS OF THE ANDROSTANE SERIES AND
PROCESS FOR THEIR MANUFACTURE
Albert Wettstein, Riehen, and Georg Anner and Ludwig
Ehmann, Basel, Switzerland, assignors to Ciba Corporation, a corporation of Delaware
No Drawing. Filed Jan. 12, 1961, Ser. No. 82,157
Claims priority, application Switzerland Jan. 14, 1960
16 Claims. (Cl. 260—239.5)

The invention relates to the manufacture of 3:17-dihydroxy compounds of the androstane and $\Delta^5$-androstene series which contain a hydrocarbon residue in position 17 and are esterified in 3-position by sulfobenzoic acid, and of the salts of said semi-esters.

The new compounds obtained by the present process are distinguished by their high antiallergic and antianaphylactic action respectively and can be used in the treatment of allergic disorders, for example asthma and allergic dermatoses. In the form of their salts the new semi-esters give stable aqueous solutions that can be sterilized with heat without undergoing decomposition.

The new sulphobenzoic acid esters are obtained when the secondary hydroxyl group in position 3 of 3:17-dihydroxy compounds of the androstane and $\Delta^5$-androstene series containing a hydrocarbon radical in position 17 is esterified with a reactive derivative of sulfobenzoic acid, for example with sulfobenzoic acid anhydride or chloride, and the resulting sulfobenzoic acid esters are converted into salts thereof. The reaction according to the present process is carried out in known manner, if desired in the presence of a suitable diluent, such as a halogenated hydrocarbon, for example methylene chloride, chloroform, or the like, and in the presence of a basic agent, such as a tertiary amine, for example pyridine, triethylamine or dimethylaniline.

Salts are obtained, for example, when an aqueous solution of the 3$\beta$:17$\beta$-dihydroxy-3-sulfobenzoate or of its pyridine salt is reacted with a hydroxide, carbonate, bicarbonate or halide of an alkali metal or alkaline earth metal, more especially of sodium, potassium, lithium, calcium, barium, strontium, magnesium, or ammonium, or with an amine. As amines are suitable aliphatic, cycloaliphatic or araliphatic amines containing 1 to 8 carbon atoms, as well as heterocyclic amines, for example mono-, di- and triethylamine, mono-, di- and trimethylamine, mono-, di- and triisopropylamine, ethyldimethylamine, benzyldiethylamine, cyclohexylamine, dibenzylamine, N:N-dibenzylethylenediamine, bis - ortho - methoxy - N-methyl-ortho-phenylisopropylamine, methoxyphenyl-isopropylamine, piperidine, morpholine, pyrrolidine, piperazine and lower alkyl derivatives thereof, such as 1-methylpiperidine, 4-ethylmorpholine, 1-isopropylpyrrolidine, 1:4-dimethylpiperazine, 1-n-butylpiperidine, 2-methylpiperidine, 1-methyl-2-methylpiperidine and the like; also amines containing water-soluble or hydrophilic groups such as mono-, di- and triethanolamine, ethyl-diethanolamine, N-butyl-monoethanolamine, 2-amino-1-butanol, 2-amino-2-ethyl - 1:3 - propanediol, 2-amino-2-methyl-1-propanol, trihydroxymethyl-aminomethane, phenylmonoethanolamine, para-tertiary amylphenyl-diethanolamine, galactamine, N-methylglucamine, N-methylglucosamine, ephedrine, phenylephedrine, epinephrine, proceine, and 2-(4'-tertiary butyl-2':6'-dimethyl-phenyl-methyl)-imidazoline.

In the starting materials, which can be prepared in known manner, the hydrocarbon radical in position 17 is more especially a saturated or unsaturated aliphatic hydrocarbon radical, for example a methyl, ethyl, propyl, isobutyl, vinyl, allyl, methallyl or ethinyl group. Starting materials that contain a methallyl or isobutyl radical in position 17 are new, and their manufacture is described in the examples.

The following examples illustrate the invention.

Example 1

A solution of 3.04 grams of 17$\alpha$-methyl-$\Delta^5$-androstene-3$\beta$:17$\beta$-diol in 80 cc. of pyridine is treated with 2.76 grams of ortho-sulfobenzoic acid anhydride, and the whole is stirred for 30 minutes at 90° C. under nitrogen. A further addition of 0.27 gram of ortho-sulfobenzoic acid anhydride is made, and the mixture is heated for 30 minutes at 90° C., whereupon 17$\alpha$-methyl-$\Delta^5$-androstene-3$\beta$:17$\beta$-diol can no longer be detected in the thin-layer chromatogramme. The reaction solution is cooled and completely evaporated under reduced pressure. The crystalline residue is dissolved in 1500 cc. of water, filtered, concentrated in vacuo to 100 cc., and allowed to stand overnight. The crystalline product thus formed is suctioned off, washed with a small amount of water and dried at 60° C. in vacuo, to yield 2.8 grams of the pyridine salt of 17$\alpha$-methyl-$\Delta^5$-androstene-3$\beta$:17$\beta$-diol-3-orthosulfobenzoate.

By using meta sulfobenzoic acid chloride there is obtained in an analogous manner the pyridine salt of 17$\alpha$-methyl-$\Delta^5$-androstene-3$\beta$:17$\beta$-diol-3-meta-sulfobenzoate.

Example 2

A solution of 3.20 grams of 17$\alpha$-ethyl-androstane-3$\beta$:17$\beta$-diol in 80 cc. of pyridine is treated with 2.76 grams of orthosulfobenzoic acid anhydride and stirred for 100 minutes at 90° C. under nitrogen, during which the orthosulfobenzoic acid anhydride dissolves practically completely. After 100 minutes 17$\alpha$-ethyl-androstane-3$\beta$:17$\beta$-diol can no longer be detected in the thin-layer chromatogramme. The reaction mixture is cooled, filtered clear and completely evaporated in vacuo. The residue is dissolved in 500 cc. of water with heating on a water bath, and the solution is filtered and concentrated to 150 cc. under reduced pressure, allowed to stand overnight. The crystals formed are suctioned off, washed with water and dried, to yield 3.32 grams of the pyridine salt of 17$\alpha$-ethyl-androstane-3$\beta$:17$\beta$-diol-3-ortho-sulfobenzoate.

Example 3

A solution of 3.44 grams of 17$\alpha$-methallyl-$\Delta^5$-androstene-3$\beta$:17$\beta$-diol in 40 cc. of pyridine is treated with 2.76 grams of ortho-sulfobenzoic acid anhydride and heated with stirring for 30 minutes at 90° C. under nitrogen, during which most of the ortho-sulfobenzoic acid anhydride passes into solution. After 30 minutes no starting material can be detected in a thin-layer chromatogramme. The reaction solution is cooled, the undissolved ortho-sulfobenzoic acid anhydride is suctioned off, and the clear, orange-colored filtrate is completely evaporate in vacuo. The reddish brown residue is taken up in 300 cc. of 0.1 N-sodium bicarbonate solution with heating, and the product is salted out with 150 grams of sodium chloride. The precipitate is kept overnight, suctioned off, washed with 30 cc. of saturated sodium chloride solution, and dried in vacuo at 60 to 70° C., to yield 5 grams of the sodium salt of 17$\alpha$-methallyl-$\Delta^5$- androstene-3$\beta$:17$\beta$-diol-3-ortho-sulfobenzoate.

The starting material used above can be prepared in the following manner:

128 grams of magnesium chipping are activated with 6 grams of iodine, cooled, and then covered with 800 cc. of tetrahydrofuran. 40 cc. of a mixture of 160 cc. of tetrahydrofuran and 80 cc. of methallyl chloride are then run in, and when the reaction has set in, the remainder of this mixture is added in the course of 30 minutes. In the course of 165 minutes a solution of 160 grams of Δ⁵-androstenolone acetate and 480 cc. of methallyl chloride in 2400 cc. of tetrahydrofuran is then added dropwise to the slightly boiling solution. After rinsing with 240 cc. of tetrahydrofuran, another 140 cc. of methallyl chloride are added within 20 minutes to achieve complete dissolution of the magnesium. The reaction mixture is refluxed for 4 hours, cooled, and poured over a mixture of 4000 grams of finely ground ice and 1200 cc. of 4 N-hydrochloric acid. The whole is extracted with ether, and the ethereal extract is successively washed repeatedly with 2 N-sulfuric acid, dilute bisulfite solution, water, N-sodium hydroxide solution and water, dried over sodium sulphate and evaporated. The white crystalline residue (179 grams) is subjected to fractional crystallization from acetone and yields 131.5 grams of 17α-methallyl-Δ⁵-androstene-3β:11β-diol, melting at 169–170° C. Optical rotation $[\alpha]_D^{27.0°} = -50.1°$ (c.=0.979% in dioxane).

*Example 4*

A solution of 52.2 grams of 17α-isobutyl-androstane-3β:17β-diol in 600 cc. of pyridine is treated with 41.4 grams of ortho-sulfobenzoic acid anhydride, and the mixture is stirred for 60 minutes at 90° C. under nitrogen. At first the reaction mixture turns slightly red-violet and finally orange, and the ortho-sulfobenzoic acid anhydride passes partially into solution. The reaction mixture is then cooled to 20 to 25° C., the undissolved ortho-sulfobenzoic acid anhydride is suctioned off and rinsed with 200 cc. of pyridine. The filtrate is completely evaporated in vacuo at a temperature gradually rising to 80° C., to yield 113.5 grams of a brownish orange residue consisting of the pyridine salt of 17α-isobutyl-androstane-3β:17β-diol-3-ortho-sulfobenzoate in addition to ortho-sulfobenzoic acid anhydride and the pyridine salt of ortho-sulfobenzoic acid. The evaporation residue is taken up in 2000 cc. of water and neutralized with 21 grams of sodium bicarbonate. The sodium salt of 17α-isobutyl-androstane-3β:17β-diol-3-ortho-sulfobenzoate crystallizes out partially. 300 grams of sodium chloride are stirred in and the mixture is suction-filtered. The separated sodium salt is stirred with 2500 cc. of water, to form a turbid solution from which the sodium salt is again salted out by stirring in 500 grams of sodium chloride. The precipitate is suctioned off and dried in vacuo at 60 to 70° C. Yield: 84.5 grams of the sodium salt of 17α-isobutyl-androstane-3β:17β-diol-3-ortho-sulfobenzoate which is contaminated with some sodium chloride. To purify the resulting crude sodium salt it is dissolved with heating in 1000 cc. of rectified alcohol, 2.5 grams of filter asbestos are added, and the whole is filtered. The clear filtrate is concentrated in vacuo to about 200 cc., whereupon the sodium salt crystallizes out gradually. The whole is kept overnight, suction-filtered, and the product is washed with 40 cc. of cooled rectified spirit and dried in vacuo at 60 to 70° C. Yield: 72.5 grams of the pure sodium salt of 17α-isobutyl-androstane-3β:17β-diol-3-ortho-sulfobenzoate, melting at 220–223° C. Optical rotation $[\alpha]_D^{24.5°} = +2.5°$ (c.=2.00% in aqueous alcohol of 25% strength).

Elementary analysis (of the product after-dried in 100° C. under 0.01 mm. Hg pressure): $C_{30}H_{43}O_6SNa$.—Calculated: C, 64.96%; H, 7.81%; Na, 4.15%. Found C, 64.6%; H, 8.0%; Na, 4.4%.

The starting material used above can be prepared thus:

(a) 268.1 grams of 17α-methallyl-Δ⁵-androstene-3β:17β-diol are dissolved in 7000 cc. of rectified spirit, treated with 40 grams of a palladium black catalyst of 5% strength, and the mixture is shaken with hydrogen at 20 to 25° C. under slightly superatmospheric pressure. The hydrogenation is complete after 8 hours. 10 grams of filter asbestos are added, the catalyst is suctioned off, and the solution is stirred for 10 minutes with 10 grams of decolorizing carbon and then filtered until it is clear. The solution is concentrated under a slight vacuum to 2 liters, cooled, kept overnight at 0° C., and the crystallisate is suctioned off. The product is thoroughly washed with 150 cc. of ice-cooled rectified spirit and dried in vacuo at 60 to 70° C. Yield: 106.4 grams of 17α-isobutyl-androstane-3β:17β-diol melting at 180°–182° C. Optical rotation $[\alpha]_D^{28°} = -1.0°$ (c.=1.034% in dioxane)

Concentration of the mother liquors yields further amounts of 17α-isobutyl-androstane-3β:17β-diol melting at 168–169° C. Optical rotation $[\alpha]_D^{27°} = \pm 0°$ (c.=1.00% in dioxane).

(b) A solution of 6.8 grams of 17α-methallyl-Δ⁵-androstene-3β:17β-diol in 100 cc. of pyridine is treated with 20 cc. of acetanhydride and the mixture is left to itself for 52 hours at 20–25° C. The yellowish brown reaction solution is completely evaporated in vacuo, the residue is dissolved in ether and washed successively with 2 N-hydrochloric acid, water, 2 N-sodium carbonate solution and water, dried, and again evaporated. Yield: 7.3 grams of a white crystalline residue melting at 138–139° C. which, after recrystallization from methanol, melts at 140–141° C. Yield: 6.6 grams of 17α-methallyl-Δ⁵-androstene - 3β:17β - diol-3-acetate. Optical rotation $[\alpha]_D^{27°} = -50.6°$ (c.=1.00% in dioxane).

A solution of 3.87 grams of 17α-methallyl-Δ⁵-androstene-3β:17β-diol-3-acetate in 120 cc. of rectified spirit is mixed successively with 3 times 0.5 grams each of a palladium black catalyst of 5% strength and then at 20–25° C. shaken under a slightly superatmospheric pressure with hydrogen. The hydrogenation is complete after 35 hours. The catalyst is filtered off, the clear solution is completely evaporated, and the residue is recrystallized from methanol. Yield: 2.12 grams of 17α-isobutyl androstene-3β:17β-diol-3-acetate melting at 80–81° C. Optical rotation $[\alpha]_D = -7.7°$ (c.=1.168% in dioxane).

A solution of 8.7 grams of 17α-isobutyl-androstane-3β:17β-diol-3-acetate in 200 cc. of methanol is treated with 10 cc. of 10 N-potassium hydroxide solution, and the whole is refluxed for 30 minutes, diluted with water, and the precipitate is taken up in ether, washed successively with dilute hydrochloric acid and water, dried over sodium sulphate, and evaporated. The residue is recrystallized from rectified spirit, to yield 6.3 grams of 17α-isobutyl-androstane-3β:17β-diol melting at 180–183° C.

*Example 5*

When 17α-propyl-androstane-3β:17β-diol is reacted as described in the preceding examples, the sodium and potassium salts of 17α-propyl-androstane-3β:17β-diol-3-ortho-sulfobenzoate can be prepared.

*Example 6*

34.86 g. of 17α-isobutyl-androstane-3β:17β-diol are dissolved in 400 ml. of pure, dry pyridine. 25.0 g. of meta-sulfobenzoyl chloride are added and the mixture stirred in an atmosphere of nitrogen at an internal temperature of 20–40° C. for 30–40 hours until in a chromatoplate (system dioxane: water 9:1; indicator 50% sulfuric acid) 17α-isobutyl-androstane-3β:17β-diol can no longer be detected. The reaction solution is then evaporated completely under reduced pressure, the bath temperature being raised gradually. The dark-colored residue is dissolved in 1000 ml. of water, neutralized with 10 g. of sodium bicarbonate, and 250 g. of sodium chloride are added while stirring, whereupon the sodium salt of 17α-isobutyl - androstane - 3β:17β - diol - 3 - meta - sulfobenzoate precipitates. The mother liquor is separated and the sodium salt taken up in 2000 ml. of water. A turbid solution is obtained from which the sodium salt of 17α - isobutyl - androstane - 3β:17β - diol - 3 - meta-sulfobenzoate is salted out again by stirring in 400 g. of sodium chloride. The precipitate is filtered off with suction and dried under reduced pressure. The yield is 42.1 g. of the sodium salt of 17α-isobutyl-androstane-3β:17β-diol-3-meta-sulfobenzoate.

What is claimed is:

1. A compound selected from the group consisting of a 3-mono-sulfobenzoic acid ester of a compound selected from the group consisting of 3β:17β-dihydroxy-androstanes and Δ⁵-androstenes which contain in 17α-position a lower aliphatic hydrocarbon residue.

2. An alkali metal salt of a 3-mono-sulfobenzoic acid ester claimed in claim 1.

3. An alkaline earth metal salt of a 3-mono-sulfobenzoic acid ester claimed in claim 1.

4. An amine salt of a 3-mono-sulfobenzoic ester claimed in claim 1 derived from an amine selected from the group consisting of an aliphatic, a cycloaliphatic, an araliphatic and a heterocyclic amine having from 1 to 8 carbon atoms.

5. The pyridine salt of 17α-methyl-Δ⁵-androstene-3β:17β-diol-3-ortho-sulfobenzoate.

6. The pyridine salt of 17α-methyl-Δ⁵-androstene-3β:17β-diol-3-meta-sulfobenzoate.

7. The pyridine salt of 17α-ethyl-androstane-3β:17β-diol-3-ortho-sulfobenzoate.

8. The sodium salt of 17α-propyl-androstane-3β:17β-diol-3-ortho-sulfobenzoate.

9. The potassium salt of 17α-propyl-androstane-3β:17β-diol-3-ortho-sulfobenzoate.

10. The sodium salt of 17α-methallyl-Δ⁵-androstene-3β:17β-diol-3-ortho-sulfobenzoate.

11. The pyridine salt of 17α-isobutyl-androstane-3β:17β-diol-3-ortho-sulfobenzoate.

12. The sodium salt of 17α-isobutyl-androstane-3β:17β-diol-3-ortho-sulfobenzoate.

13. The sodium salt of 17α-isobutyl-androstane-3β:17β-diol-3-meta-sulfobenzoate.

14. 3β:17β-dihydroxy-androstane having an isobutyl group in 17α-position.

15. 3β:17β-dihydroxy-Δ⁵-androstene having a methallyl group in 17α-position.

16. 3β:17β-dihydroxy-Δ⁵-androstene having an isobutyl group in 17α-position.

References Cited in the file of this patent

UNITED STATES PATENTS

| | | |
|---|---|---|
| 2,184,775 | Schwenk et al. | Dec. 26, 1939 |
| 2,845,381 | Tindall | July 29, 1958 |